United States Patent
Kar et al.

(10) Patent No.: US 9,130,865 B2
(45) Date of Patent: Sep. 8, 2015

(54) METHOD AND NETWORK ELEMENT TO LIMIT SERVICE DISRUPTION DUE TO A FAILURE ON A LAYER 2 INTERFACE

(71) Applicant: TELEFONAKTIEBOLAGET L M ERICSSON (PUBL), Stockholm (SE)

(72) Inventors: Suryamani Kar, Santa Clara, CA (US); Dawei Wang, Mountain View, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 230 days.

(21) Appl. No.: 13/712,642

(22) Filed: Dec. 12, 2012

(65) Prior Publication Data
US 2014/0160919 A1    Jun. 12, 2014

(51) Int. Cl.
| | |
|---|---|
| *H04L 12/26* | (2006.01) |
| *H04L 12/56* | (2006.01) |
| *H04J 3/16* | (2006.01) |
| *H04J 3/06* | (2006.01) |
| *G06F 15/173* | (2006.01) |
| *G06F 11/00* | (2006.01) |
| *H04L 12/703* | (2013.01) |
| *H04W 40/02* | (2009.01) |
| *H04W 24/04* | (2009.01) |

(52) U.S. Cl.
CPC ............... *H04L 45/28* (2013.01); *H04W 24/04* (2013.01); *H04W 40/02* (2013.01)

(58) Field of Classification Search
CPC ....... H04L 45/28; H04W 40/02; H04W 24/04
USPC .................. 370/221, 328, 217, 401, 469, 503; 714/4, 2, 4.2; 709/238, 239
See application file for complete search history.

(56) References Cited

U.S. PATENT DOCUMENTS

| | | | |
|---|---|---|---|
| 7,197,660 B1 * | 3/2007 | Liu et al. .................... | 714/4.12 |
| 8,792,501 B1 | 7/2014 | Rustagi et al. | |
| 2005/0021844 A1 * | 1/2005 | Puon et al. .................... | 709/238 |
| 2009/0285090 A1 * | 11/2009 | Allasia et al. .................. | 370/221 |
| 2010/0220656 A1 * | 9/2010 | Ramankutty et al. ......... | 370/328 |
| 2012/0195189 A1 | 8/2012 | Wang | |
| 2012/0243442 A1 | 9/2012 | Musku et al. | |

OTHER PUBLICATIONS

National Broadbrand Network (NBNCo), "Fixed Wireless Fact Sheet", 4 Pages, downloaded on Dec. 12, 2012 from www.nbnco.com.au/assets/documents/fixed-wireless-factsheet.pdf/.
National Broadbrand Network—NBN, "Fixed Wireless Rollout", 1 page, Date Nov. 27, 2012, www.nbn.gov.au/about-the-nbn/rbn-progress/fixed-wireless-service/.

* cited by examiner

*Primary Examiner* — Alpus H Hsu
*Assistant Examiner* — Camquyen Thai
(74) *Attorney, Agent, or Firm* — Nicholson de vos Webster & Elliott LLP

(57) ABSTRACT

A method in an active network element. The network element is coupled with a standby network element by an inter-chassis communication channel used to synchronize session state for sessions handled by the active network element from the active network element to the standby network element. The network element is deployed in a Layer 3 network that is used to transmit Layer 2 data. The method is one of limiting disruption in the handling of the sessions. The method includes monitoring a Layer 2 interface for failures and monitoring a Layer 3 interface for failures. A failure is detected on the Layer 2 interface. The network element communicates with the standby network element, over the inter-chassis communication channel, in response to detecting the failure on the Layer 2 interface, to have the standby network element at least assist with the handling of the sessions.

14 Claims, 9 Drawing Sheets

METHOD AND NETWORK ELEMENT TO LIMIT SERVICE DISRUPTION DUE TO A FAILURE ON A LAYER 2 INTERFACE

BACKGROUND

1. Field

Embodiments of the invention relate to the field of networking; and more specifically to providing inter-chassis redundancy.

2. Background Information

FIG. 1 is a block diagram of a known 3rd Generation Partnership Project (3GPP) Long Term Evolution (LTE) architecture cellular network 100. User equipment (UE) 101 (e.g., mobile phones, laptops, Machine to machine (M2M) devices, and other wireless devices) may establish wireless connections 102 with the LTE network through an eNodeB 103. The eNodeB represents the LTE network base station that serves as an access point for the user equipment connectivity to the LTE network. Generally there will be a number of geographically distributed base stations that are used by the user equipment to access the network.

User data (e.g., IP packets) sent from and/or delivered to the user equipment (UE) may be processed by a Serving Gateway (S-GW) 104 and a Packet Data Network Gateway (PDN-GW) 105. The S-GW is coupled or in communication with the eNodeB by a user plane interface (S1U). This interface may handle the per-bearer user plane tunneling and inter-eNodeB path switching during handover. The S-GWs may receive user data over the S1U interfaces and may buffer downlink IP packets destined for UE that happen to be in idle mode. The S-GWs is coupled or in communication with a Mobility Management Entity (MME) 106 by an S11 interface. The MME represents a control-node for the LTE access-network and generally provides subscriber and session management. The S-GW is coupled or in communication with the PDN-GW by an S5 interface. The S5 interface may provide user plane tunneling and tunnel management between the S-GW and the PDN-GW and may be used for S-GW relocation due to user equipment mobility. The PDN-GW may include logic for IP address allocation, charging, packet filtering, policy-based control of flows, etc. The PDN-GW 105 may also serve as a gateway towards external IP networks (e.g., the Internet) 107. For example, the PDN-GW may be coupled with one or more edge network elements that provide access to the Internet.

The S-GW, PDN-GW, and MME are subcomponents of the Evolved Packet Core (EPC) or core network architecture 108 of LTE. The S-GW, PDN-GW, and MME are logically separate entities according to LTE, although they may be physically deployed on either one or more physical network elements and/or chassis. For example, a combined gateway (C-GW) may combine the S-GW and PDN-GW logical entities within a single network element or chassis. The network may include other network elements (not shown), such as, for example, one or more routers and/or switches between the eNodeB and the S-GW, between the S-GW and the PDN-GW, and/or between the PDN-GW and the Internet.

FIG. 2 is a block diagram of a known approach for transporting Layer 2 data 210 over an LTE network 200. The LTE network is an all-IP network operating at Layer 3 of the OSI model. Currently, the LTE network does not provide support for transporting the Layer 2 data 212, or data link layer data, as such. A Layer 2 device 209 is to transmit Layer 2 data toward the LTE network. By way of example, the Layer 2 data may represent an Ethernet bit stream (e.g., Ethernet frames). The LTE network having a PDN-GW 205 and a S-GW 204 receives the Layer 2 data. A Layer 3 encapsulation module 211 of the LTE network, often deployed in a PDN-GW 205, or alternatively employed in a combined gateway having the PDN-GW and the S-GW 204, is operable is to encapsulate the Layer 2 data within a Layer 3 format. The Layer 3 encapsulated Layer 2 data 212 is then transmitted toward user equipment (UE) 201. By way of example, such an approach may allow fixed Layer 2 device to transmit Layer 2 data to cellular phones or other user equipment leveraging the LTE network.

FIG. 3 is a block diagram of a known encapsulation approach for transporting Layer 2 data over an LTE network. A Layer 2 device 309 provides Ethernet data having Service Labels (e.g., an S-Vlan (S) and a C-Vlan (C)). A soft-Generic Routing Encapsulation (GRE) device (e.g., a cross-connect device) 313 may encapsulate the Ethernet data with inner IP, GRE, and Multiprotocol Label Switching (MPLS). A PDN-GW 305 may further encapsulate this with an outer IP, User Datagram Protocol (UDP), and general packet radio service Tunneling Protocol (GTP). An S-GW 304 may also transmit the Ethernet data by outer IP, UDP, GTP, inner IP, GRE, and MPLS. An eNodeB 303 may remove the outer IP, UDP, and GTP. User equipment 301 may remove the inner IP, GRE, and MPLS to retrieve the Ethernet data.

In communication networks it is generally desirable to prevent service outages and/or loss of network traffic. By way of example, such service outages and/or loss of network traffic may occur when a network element fails, loses power, is taken offline, is rebooted, a communication link to the network element breaks, etc. In order to help prevent such service outages and/or loss of network traffic, the communication networks may utilize inter-chassis redundancy (ICR). ICR is a high availability (HA) solution that increases the availability of network elements, and may optionally be used to provide geographical redundancy. ICR is commonly implemented through a mated pair of an active network element and a standby network element. The active network element handles current sessions using session state that is built up over runtime. The session data is synchronized or replicated from the active network element to the standby network element. The standby network element begins to handle the sessions when an ICR switchover event occurs.

ICR is commonly used in LTE networks to help to provide resiliency. However, when Layer 2 data is transmitted through the LTE network, the conventional ICR system may not provide sufficient protection against service outages and/or loss of network traffic.

SUMMARY

In one aspect, a method is performed in an active network element. The active network element is coupled with a standby network element by an inter-chassis communication channel used to synchronize session state for sessions handled by the active network element from the active network element to the standby network element. The active network element is deployed in a Layer 3 network that is used to transmit Layer 2 data. The method is one of limiting disruption in the handling of the sessions. The method includes steps of monitoring a Layer 2 interface for failures and monitoring a Layer 3 interface for failures. The method also includes a step of detecting a failure on the Layer 2 interface. The method further includes a step of communicating with the standby network element, over the inter-chassis communication channel, in response to detecting the failure on the Layer 2 interface. The communication is to have the standby network element at least assist with the handling of the sessions. One possible advantage of the method is that it helps to limit disruption in the handling of the sessions due to the failure on the Layer 2 interface.

In one aspect, an active network element, which is operable to be coupled with a standby network element by an inter-chassis communication channel. The active network element is operable to be deployed in a Layer 3 network that is to be used to transmit Layer 2 data. The active network element includes a Layer 2 interface and a Layer 3 interface. The active network element also includes an inter-chassis redundancy (ICR) system coupled with the Layer 2 and Layer 3 interfaces. The ICR system includes a Layer 2 interface monitor module to monitory the Layer 2 interface for failures. The ICR system also includes an inter-chassis communication module that is operable to synchronize session state, for sessions that are to be handled by the active network element, from the active network element to the standby network element. The ICR system includes at least one module, which is coupled with the Layer 2 interface monitor module and the inter-chassis communication module. The at least one module, in response to a failure detected on the Layer 2 interface by the Layer 2 interface monitor module, is operable to cause the inter-chassis communication module to communicate with the standby network element, over the inter-chassis communication channel. The communication is operable to have the standby network element at least assist with the handling of the sessions. One possible advantage of the active network element is that it helps to limit disruption in the handling of the sessions due to the failure on the Layer 2 interface.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

As mentioned in the background section, when Layer 2 data is transmitted through the LTE network, the conventional ICR system may not provide sufficient protection against service outages and/or loss of network traffic. The current ICR system used in the PDN-GW and/or the network element performing the Layer 3 encapsulation of the Layer 2 data is not conventionally operable to monitor and detect failures on a Layer 2 interface. Following a failure on the Layer 2 interface, the network may detect the failure and begin to forward downlink traffic to the Layer 2 interface of the standby network element instead of to the active network element having the failed Layer 2 interface. However, uplink traffic may still be received on the Layer 3 interface of the active network element. This may lead to the uplink packets being dropped at the active network element as a result of the failure on the Layer 2 interface. Additionally, the standby network element may not be fully ready to assume handling of the traffic. Accordingly, both the active and standby network elements may potentially be not fully operational following a failure on the Layer 2 interface. This is due in part to the conventional ICR system being generally incapable of detecting the failure on the Layer 2 interface and taking appropriate precautionary actions (e.g., initiating a switchover). This may tend to cause service outages and/or loss of network traffic, which can be costly in terms of revenue and time.

Disclosed herein are inter-chassis redundancy (ICR) methods to protect against Layer 2 failures and network elements to protect against Layer 2 failures. In the following description, numerous specific details are set forth, such as, for example, specific networks, protocols, encapsulation approaches, network element configurations, component partitioning/integration options, orders of operation, and the like. However, it is understood that embodiments of the invention may be practiced without these specific details. In other instances, well-known circuits, structures and techniques have not been shown in detail in order not to obscure the understanding of this description.

Figure 4:
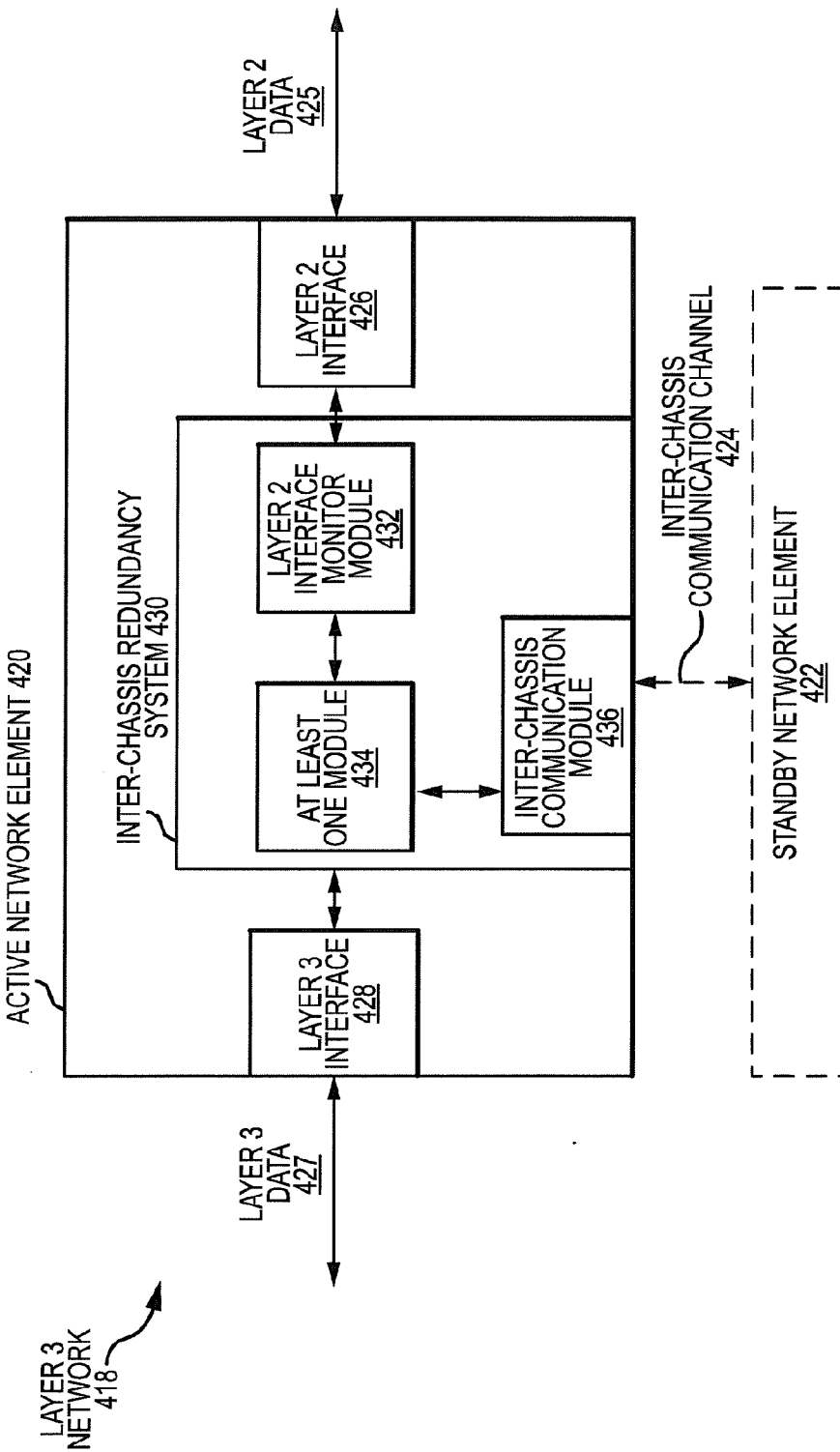
FIG. 4 is a block diagram of an embodiment of an active network element and a standby network element.

FIG. 4 is a block diagram of an embodiment of a first, active network element 420 and a second, standby network element 422. The active and standby network elements have separate chassis. The active network element is coupled with the standby network element by an inter-chassis communication channel 424. The active and standby network elements may be substantially identical, or may be different (e.g., have different sizes or capacities, different hardware configurations, different functionalities, etc.).

As used herein, a network element (e.g., a router, switch, bridge, gateway, etc.) is a piece of networking equipment, including hardware and software that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video).

Subscriber end stations (e.g., servers, workstations, laptops, netbooks, palm tops, mobile phones, smartphones, multimedia phones, Voice Over Internet Protocol (VOIP) phones, user equipment, Machine to machine (M2M) devices, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For layer 2 forwarding, the network element can store one or more bridging tables that are used to forward data based on the layer 2 information in this data.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

Referring again to FIG. 4, in some embodiments, the active network element 420 and the standby network element 422 may be located in different geographical locations to provide a geographically distributed ICR system and/or geographical redundancy of session state. The different geographical locations may be remotely located from one another (e.g., locations at least several miles apart, different towns or cities, different states, different countries, etc.). Using ICR with geographical redundancy may help to reduce service outages and/or loss of network traffic in the event of a geographically localized disruption of service (e.g., due to local loss of power, catastrophic weather, or other such localized events). In the event of such a geographically localized disruption of service, network traffic handling may be switched to the other network element at the other geographical location, which generally should not be affected by the same geographically localized disruption of service. Alternatively, the active and standby network elements may optionally be located at the same geographical location.

In some embodiments, the active and standby network elements 420, 422 are operable to be deployed in a Layer 3 network 418 that is to be used to transmit Layer 2 data 425 (e.g., Ethernet data). In some embodiments, the active and standby network elements may be part of and/or operable to be coupled within a Long Term Evolution (LTE) cellular network. In some embodiments, the active and standby network elements may each include a packet data network gateway (PDN-GW), or a successor to the PDN-GW, future version of the PDN-GW, or substitute for the PDN-GW (e.g., include a set of modules to implement the functionality of the PDN-GW, or a successor, future version, or substitute thereof).

The active network element 420 includes a Layer 2 interface 426 and a Layer 3 interface 428. In some embodiments, the Layer 2 interface may include at least one Layer 2 port and at least one link aggregation group (LAG). The Layer 2 interface is operable to receive the Layer 2 data 425 (e.g., an Ethernet bit stream, Ethernet frames, etc.). The Layer 3 interface is operable to receive Layer 3 data 427 (e.g., IP encapsulated Layer 2 data, etc.).

An inter-chassis redundancy (ICR) system 430 is coupled with the Layer 2 interface 426 and the Layer 3 interface 428. The ICR system includes a Layer 2 interface monitor module 432. The Layer 2 interface monitor module is operable to monitor the Layer 2 interface 426 for failures (e.g., failures of a Layer 2 port and/or a LAG). The ICR system also includes an inter-chassis communication module 436. The inter-chassis communication module is operable to synchronize session state, for sessions that are to be handled by the active network element, from the active network element to the standby network element.

The ICR system further includes at least one module 434. The at least one module 434 is coupled with the Layer 2 interface monitor module 432 as well as coupled with the inter-chassis communication module 436. The at least one module 434, in response to a failure detected on the Layer 2 interface 426 by the Layer 2 interface monitor module 432, operable to cause the inter-chassis communication module 436 to communicate with the standby network element 422, over the inter-chassis communication channel 424, to have the standby network element 422 at least assist with the handling of the sessions (e.g., assist with the handling of the sessions and/or fully handle the sessions).

Figure 6:
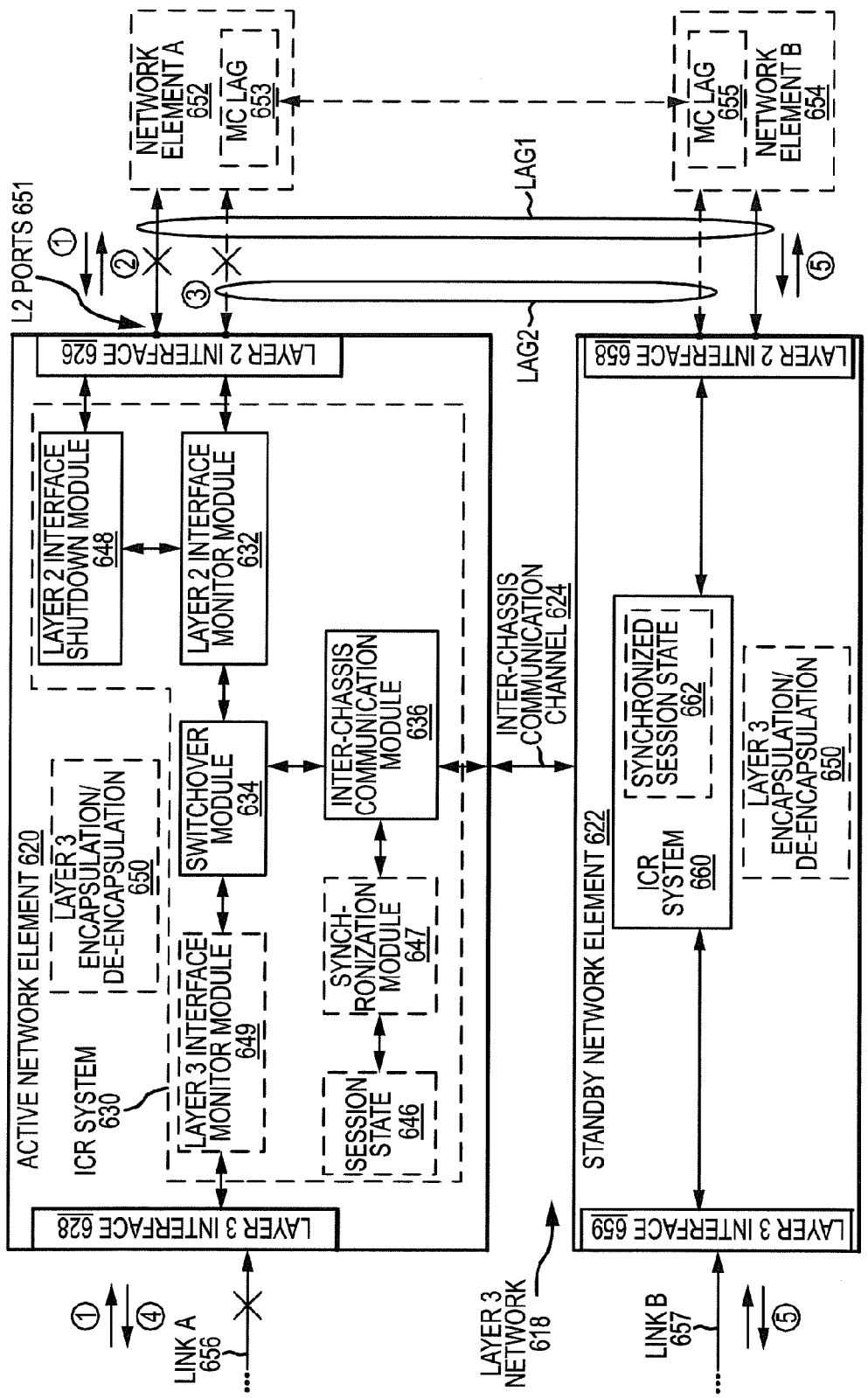
FIG. 6 is a block diagram of a first detailed embodiment of an active network element and a standby network element.
Figure 7:
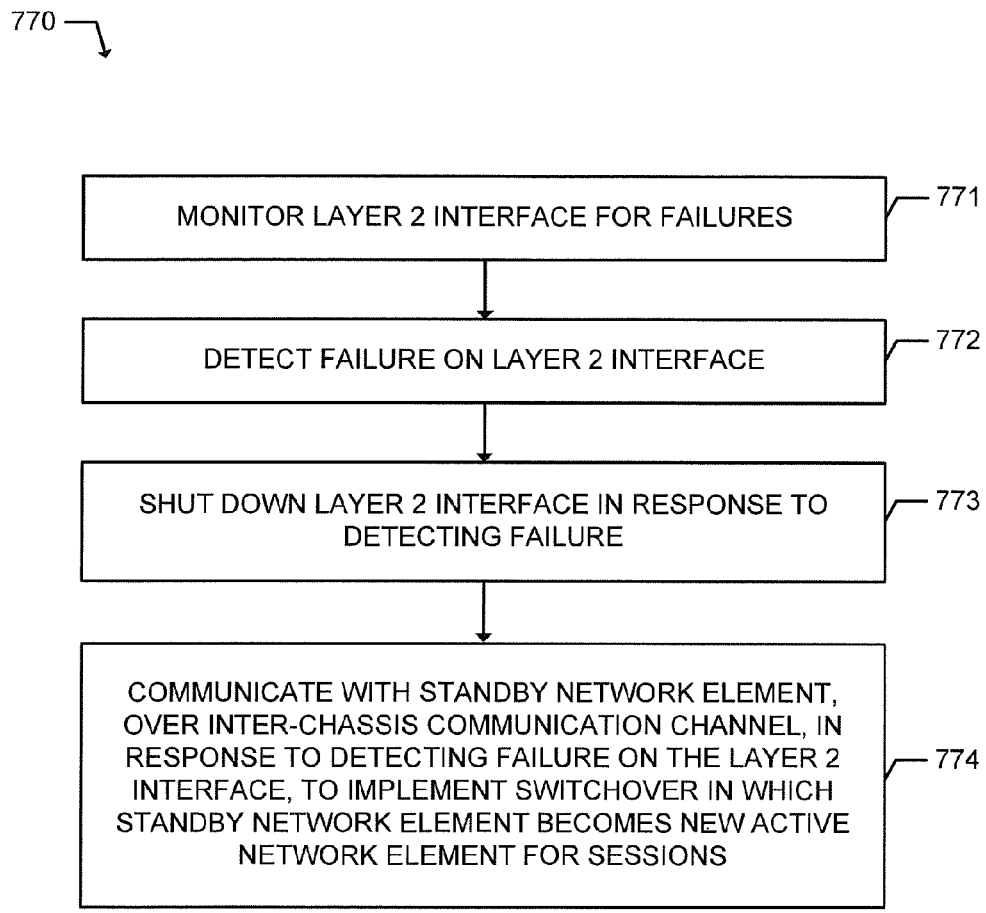
FIG. 7 is a block flow diagram of a first detailed embodiment of a method performed in an active network element.
Figure 8:
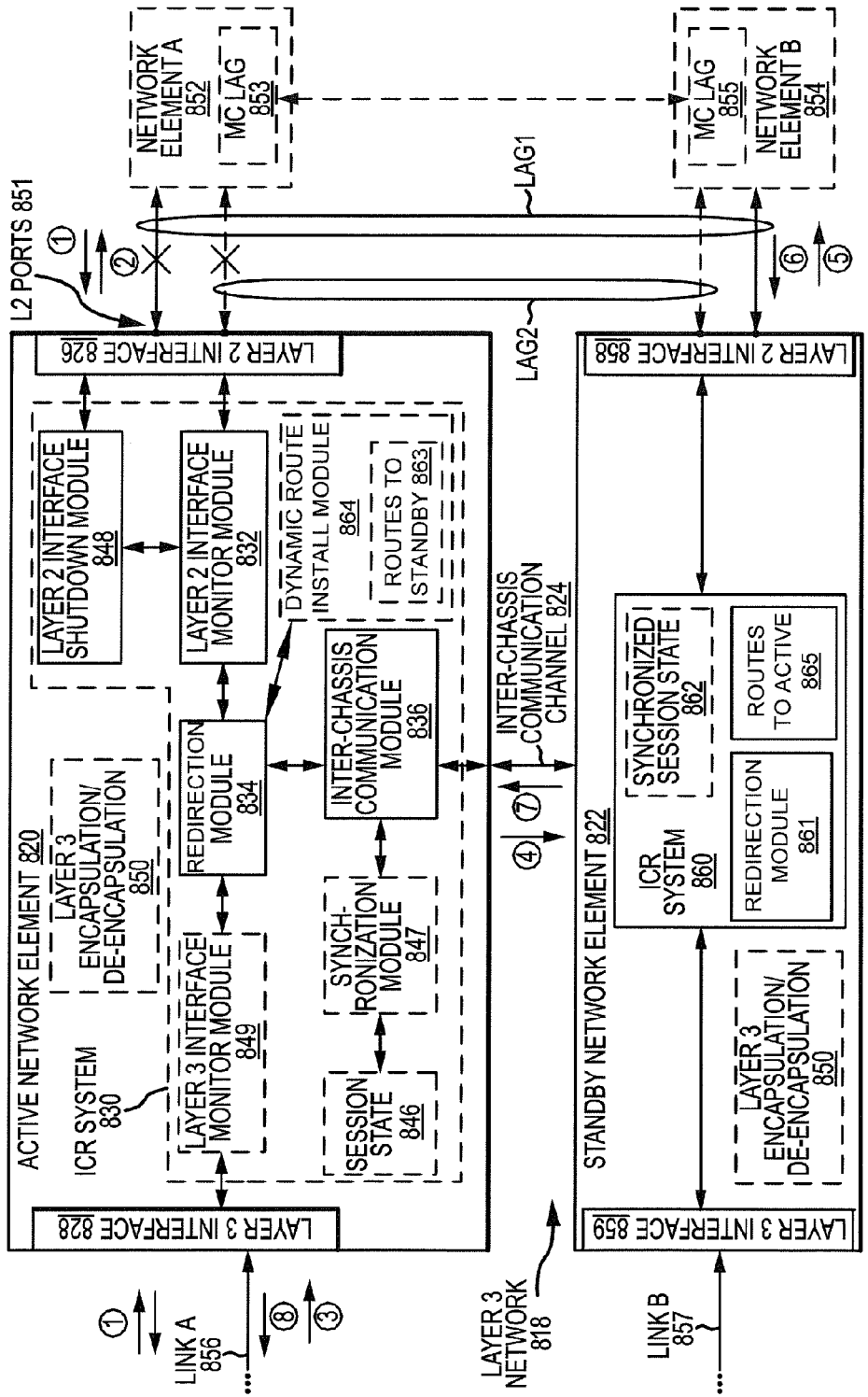
FIG. 8 is a block diagram of a second detailed embodiment of an active network element and a standby network element.
Figure 9:
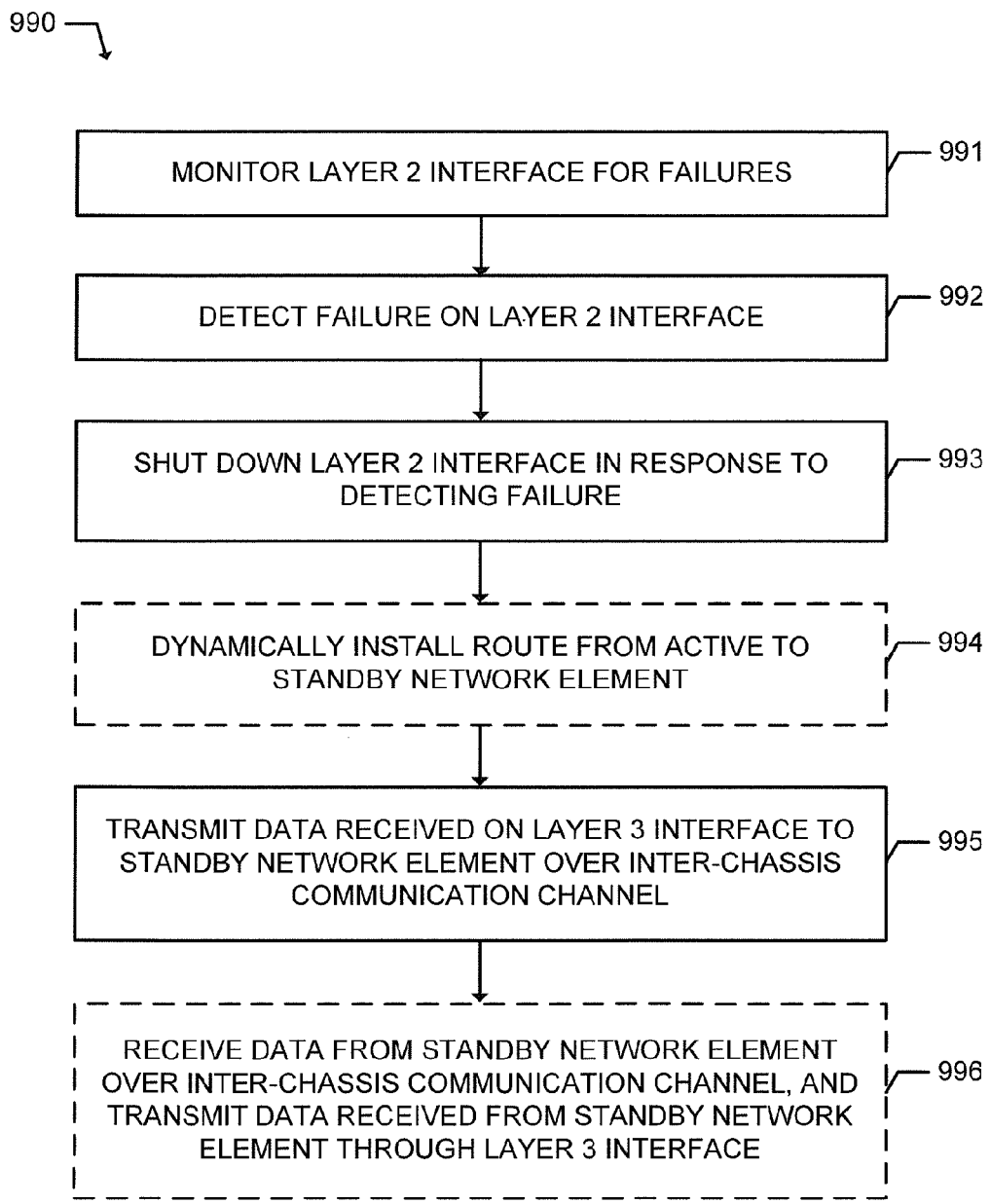
FIG. 9 is a block flow diagram of a second detailed embodiment of a method performed in an active network element.

Different embodiments of the at least one module and the type of communication with the standby network element are contemplated. In some embodiments, the at least one module may include a switchover module that is operable to communicate with the standby network element to implement a switchover so that the standby network element becomes the new active network element to handle the sessions. FIGS. 6-7 provide further details on such embodiments. In other embodiments, the at least one module may include a redirection module to redirect traffic associated with the sessions that has been received on the Layer 3 interface to the standby network element. The standby network element may forward the traffic through its corresponding Layer 2 interface which may avoid needing to use the Layer 2 interface of the active network element on which a failure has occurred. FIGS. 8-9 provide further details on such embodiments.

In some embodiments, the Layer 2 interface monitor module, the inter-chassis communication module, and the at least one module, may be implemented as modules on a control plane. Examples of suitable cards include, but are not limited to, controller cards (e.g., an XCRP (Cross-Connect Route Processor) card, an ASE (Advanced Service Engine) card, a Route Processor card, and other control cards known in the arts. The modules may be implemented in software, firmware, hardware, or a combination. In some embodiments, at least one of the cards may include at least some firmware and/or hardware.

Figure 5:
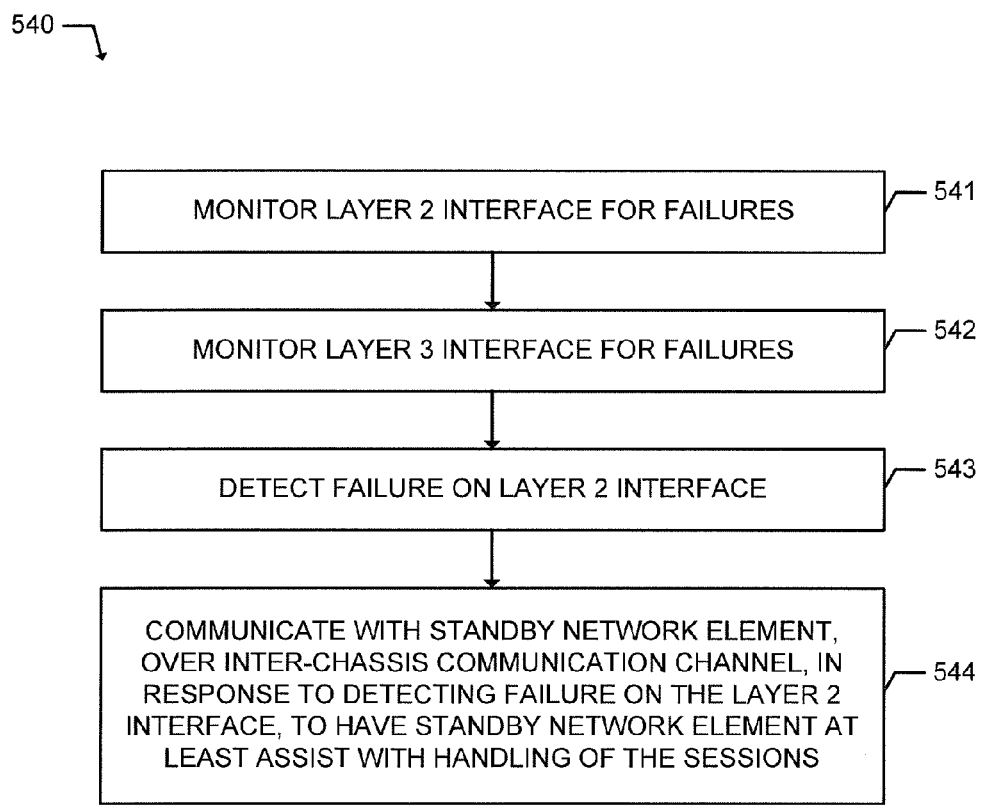
FIG. 5 is a block flow diagram of an embodiment of a method performed in an active network element.

FIG. 5 is a block flow diagram of an embodiment of a method 540, which is performed in an active network element, of limiting disruption in the handling of sessions handled by the active network element. The active network element in which the method is performed is coupled with a standby network element, by an inter-chassis communication channel, which is used to synchronize session state for the sessions handled by the active network element, from the active network element to the standby network element. In some embodiments, the active network element is deployed in a Layer 3 network that is used to transmit Layer 2 data.

In some embodiments, the method 540 may be performed by the active network element of FIG. 4. Alternatively, the method may be performed by a similar or entirely different active network element. Moreover, the active network element of FIG. 4 may perform the method 540, similar methods, or entirely different methods.

The method includes monitoring a Layer 2 interface for failures, at block 541. In some embodiments, this may include monitoring at least one Layer 2 port and/or at least one link aggregation group (LAG). In some embodiments, the Layer 2 interface is operable to receive Layer 2 data (e.g., an Ethernet bit stream, Ethernet frames, etc.).

A Layer 3 interface is monitored for failures, at block 542. In some embodiments, the Layer 3 interface is operable to receive Layer 3 data (e.g., IP data, IP encapsulated Layer 2 data, etc.).

A failure is detected on the Layer 2 interface, at block 543. For example, the failure may be a failure of a Layer 2 port, a failure of a LAG, etc.

At block 544, the active network elements communicates with the standby network element over the inter-chassis communication channel, in response to detecting the failure on the Layer 2 interface, to have the standby network element at least assist with the handling of the sessions. In some embodiments, the active network element communicates with the standby network element to implement a switchover so that the standby network element becomes the new active network element to handle the sessions. In other embodiments, the active network element communicates with the standby network element to redirect traffic associated with the sessions that has been received on the Layer 3 interface to the standby network element. The standby network element may then forward the traffic through its corresponding Layer 2 interface, which may avoid needing to use the Layer 2 interface of the active network element on which a failure has occurred.

FIG. 6 is a block diagram of a first detailed embodiment of a first, active network element 620 and a second, standby network element 622. The active and standby network elements have separate chassis. The active network element is coupled with the standby network element by an inter-chassis communication channel 624. The active and standby network elements may be substantially identical, or may be different (e.g., have different sizes or capacities, different hardware configurations, different functionalities, etc.).

In some embodiments, the active and standby network elements may be operable to be deployed in a Layer 3 network 618 that is to be used to transmit Layer 2 data. In some embodiments, the active and standby network elements may be part of and/or operable to be coupled within a Long Term Evolution (LTE) cellular network over which Layer 2 data (e.g., Ethernet data) is to be transmitted. In some embodiments, the active and standby network elements may each include a packet data network gateway (PDN-GW), or a successor to the PDN-GW, future version of the PDN-GW, or substitute for the PDN-GW (e.g., include a set of modules to implement the functionality of the PDN-GW, or a successor, future version, or substitute thereof).

Each of the active and standby network elements includes a corresponding Layer 2 interface 626, 658. In some embodiments, each Layer 2 interface may include a plurality of Layer 2 ports 651 which are grouped with corresponding Layer 2 ports of the other network element by a plurality of link aggregation groups (LAGs). In the illustration, two LAG are shown, namely a LAG1 and a LAG 2, although any desired number may be included. Each Layer 2 interface is operable to receive and transmit Layer 2 data (e.g., an Ethernet bit stream, Ethernet frames, etc.). The Layer 2 interface of the active network element is to be coupled to receive and transmit Layer 2 data with a next hop network element A 652 having a multi-chassis LAG (MC LAG) module 653. The Layer 2 interface of the standby network element is to be coupled to receive and transmit Layer 2 data with a next hop network element B 654 having an MC LAG module 655. In one example, the network elements A and B may be customer edge network elements, although the scope of the invention is not so limited.

Each of the active and standby network elements includes a corresponding Layer 3 interface 628, 659. Each Layer 3 interface is operable to receive and transmit Layer 3 data (e.g., IP encapsulated Layer 2 data, etc.). The Layer 3 interface of the active network element is to be coupled to receive and transmit Layer 3 data over a link A 656. The Layer 3 interface of the standby network element is to be coupled to receive and transmit Layer 3 data over a link B 657. In one example, the links A and B may be from a common, shared network element (e.g., a switch). In another example, the links A and B may be from either the same or separate network elements (e.g., either the same or separate network elements implementing S-GW modules, although the scope of the invention is not so limited).

Each of the active and standby network elements includes a corresponding inter-chassis redundancy (ICR) system 630, 660. Each ICR system is coupled with the corresponding Layer 2 interface and coupled with the corresponding Layer 3 interface. To simplify the description, the ICR system of the active network element is described in detail, whereas the ICR system of the standby network element is described in a simplified form that emphasizes the different or additional features. However, it is to be appreciated that the ICR system of the standby network element may be similar to, or the same as, that of the active ICR system, except for the differences mentioned below.

The active network element is operable to handle existing sessions. The active network element creates, maintains, and utilizes corresponding session state 646. The active network element includes a session synchronization module 647 to synchronize or replicate the session state on the standby network element as synchronized or replicated session state 662. The inter-chassis communication channel may be used to exchange the synchronization messages. The inter-chassis communication module 636 may be used to exchange the synchronization messages on the channel. The synchronized session state stored on the standby network element may represent a replica, redundant set, or copy of the session state, which may allow the standby network element to handle the sessions when needed (e.g., after a switchover event).

The ICR systems may detect switchover events. By way of example, the ICR systems may exchange keepalive or heartbeat messages over the synchronization channel in order to monitor the status of the other network element and control switchovers in response to switchover events. Examples of switchover events include, but are not limited to, the active network element or a portion thereof failing, the active network element or a critical portion thereof being taken offline (e.g., by a network operator in order to perform maintenance or an upgrade), the active network element rebooting, breaks in a communication link leading to the active network element, loss of power to the active network element, network operator induced switchovers (e.g., through a command-line interface (CLI) command), etc.

The ICR system 630 includes a Layer 2 interface monitor module 632. The Layer 2 interface monitor module is operable to monitor the Layer 2 interface 626 for failures (e.g., failures of a Layer 2 port and/or a LAG). The ICR system also includes a switchover module 634 that is operable to cause the inter-chassis communication module 636 to communicate with the standby network element to initiate or implement a switchover. The switchover may cause the active network element to become inactive and/or standby network element, and may cause the standby network element to become the new active network element responsible for handling the sessions. Advantageously, this may help to limit disruption in the handling of the sessions (e.g., avoid service failures and/or outages) and/or may help to provide more seamless Layer 2 service.

In some embodiments, the ICR system may include a Layer 2 interface shutdown module 648 that is coupled with the Layer 2 interface monitor module. The Layer 2 interface shutdown module may be operable to shut down the Layer 2 interface on the active network element (e.g., remaining tracking Port and/or LAG) in response to the detection of the failure by the Layer 2 interface monitor module.

Referring to the illustration, initially, as shown at numeral (1), Layer 2 data may be exchanged with network element A 652 on the Layer 2 interface 626 of the active network element. Also, Layer 3 data may be exchanged over link A 656 on the Layer 3 interface of the active network element. Then, as shown at numeral (2), the Layer 2 interface monitor module 632 may detect a failure (designated by an "X") on the Layer 2 interface of the active network element. The switchover module 634 may communicate with the standby network element to initiate or implement a switchover. As shown at numeral (3), the Layer 2 interface shutdown module 648 may shutdown the Layer 2 interface (e.g., remaining Layer 2 ports and/or LAG). As shown at numeral (4), the active network element may also shut down the Layer 3 interface 628. The standby network element 622 may transition to the new active network element and the active network element 620 may either become inactive or the new standby network element. The network (e.g., the MC LAG 653, 655) may detect the failure and forward traffic to the new active network element. As shown at numeral (5), subsequent Layer 2 data may be exchanged with network element B on the Layer 2 interface 658 of the new active network element 622. Also, subsequent Layer 3 data may be exchanged over link B on the Layer 3 interface 657 of the new active network element 622.

Although in the description above a failure on the Layer 2 interface 626 has been described, other embodiments pertain to failures on the Layer 3 interface 628. As shown, in some embodiments, the active network element may include a Layer 3 interface monitor module 649. In one embodiment, the Layer 3 interface monitor module may be a VRRP module, although the scope of the invention is not so limited. Layer 3 interface monitor module may be coupled with the switchover module 634. In response to detection of a failure on the Layer 3 interface (e.g., the link A being down), the Layer 3 interface monitor module may signal or communicate with the switchover module 634 to initiate or implement a switchover. In some embodiments, the Layer 2 interface shutdown module may also shut down the Layer 2 interface. Uplink traffic will then flow from the link B to the Layer 3 interface of the new active network element. MC-LAG will switchover and downlink traffic will then flow through the Layer 2 interface of the new active network element.

In some embodiments, in the event of the standby network element detecting a failure on its Layer 2 interface, it may communicate this to the active network element. For example, it may send a control message with a flag indicating that its Layer 2 interface is non-functional over the inter-chassis communication channel. As another option, the standby network element may cease to send so-called heartbeat messages to the active network element over the inter-chassis communication channel. The active network element, upon receiving either or both of such indications, may transition from the state "active with peer" to "active no peer." In one aspect, while in such an "active no peer" state, the active network element may not switchover in the event of a failure on its Layer 2 interface or otherwise.

Figure 1:
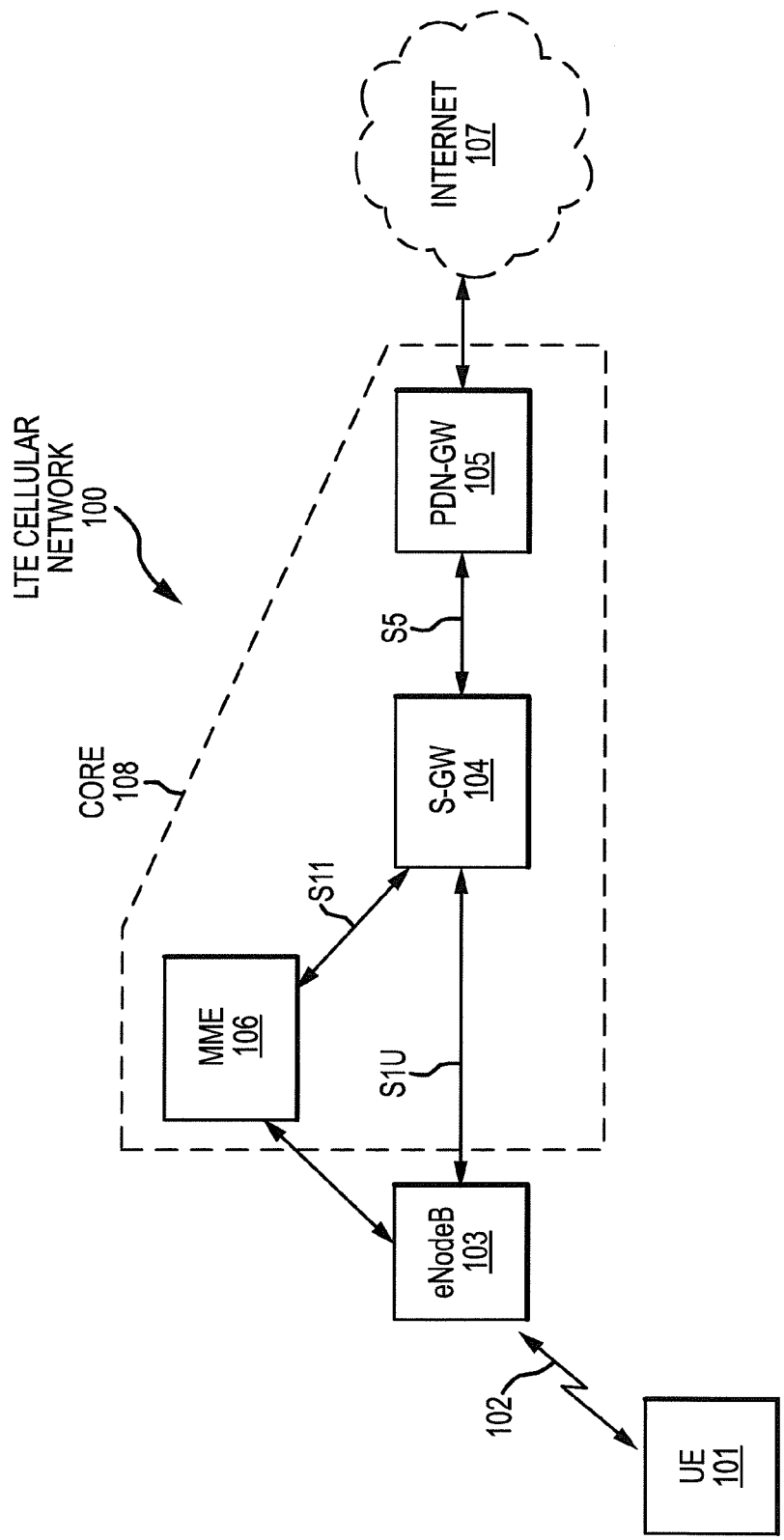
FIG. 1 is a block diagram of a known 3rd Generation Partnership Project (3GPP) Long Term Evolution (LTE) architecture cellular network.
Figure 2:
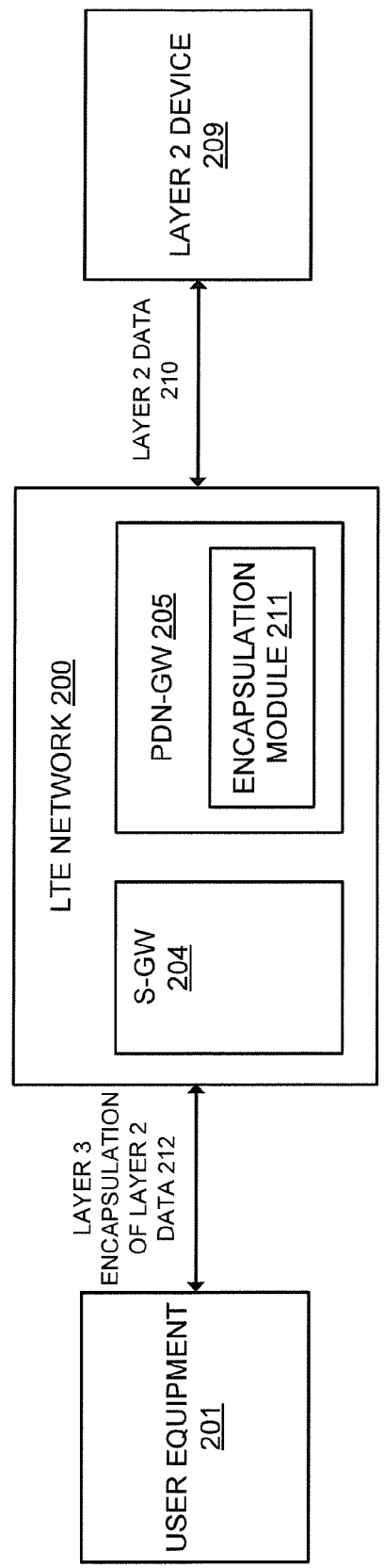
FIG. 2 is a block diagram of a known approach for transporting Layer 2 data over an LTE network.
Figure 3:
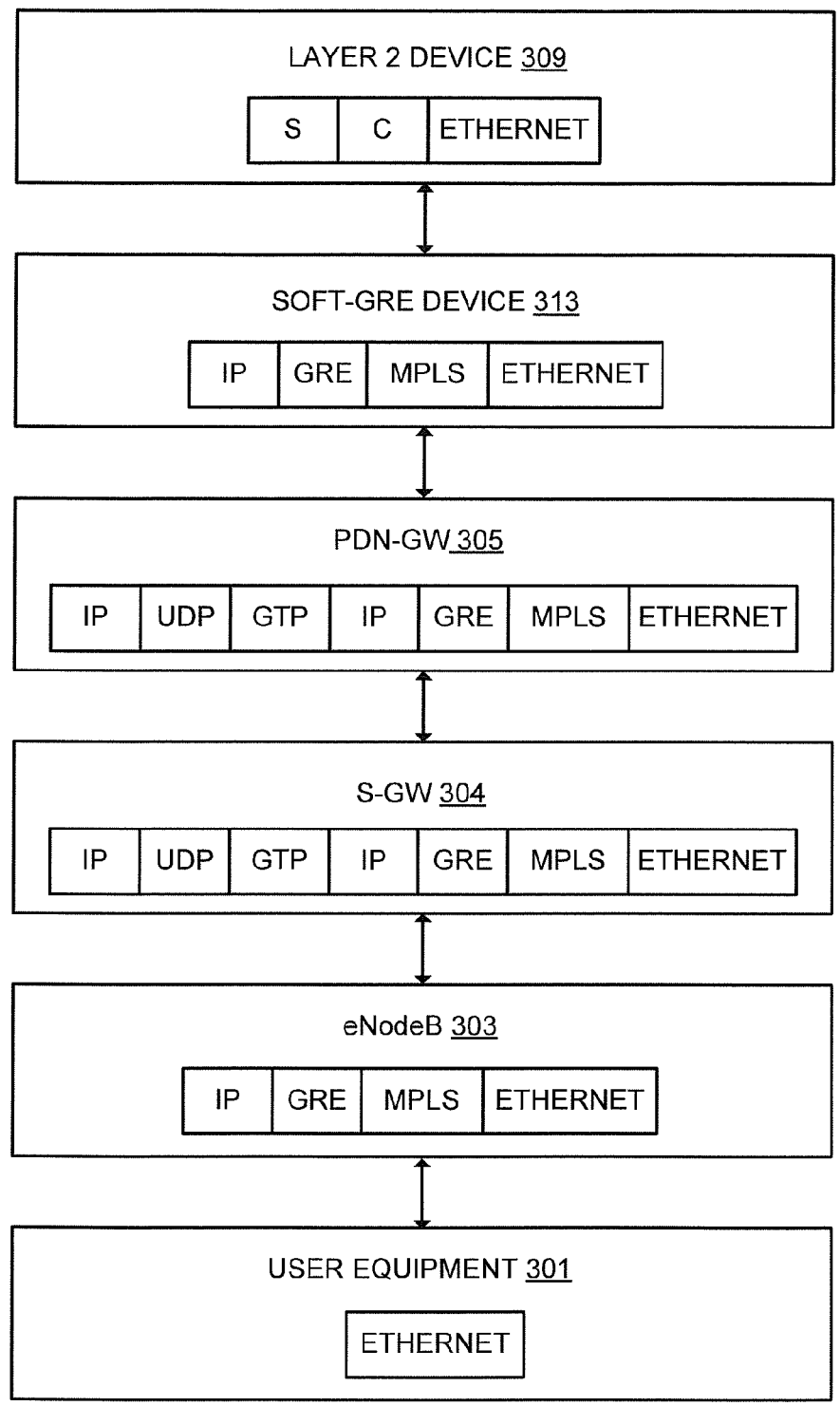
FIG. 3 is a block diagram of a known encapsulation approach for transporting Layer 2 data over an LTE network.

As shown, in some embodiments, each of the active and standby network elements may optionally include a corresponding encapsulation/de-encapsulation module 650, although the scope of the invention is not limited in this regard. The encapsulation/de-encapsulation modules may be operable to perform Layer 3 encapsulation of Layer 2 data that is to be sent through the Layer 3 interface. The encapsulation/de-encapsulation modules may also be operable to perform Layer 3 de-encapsulation of Layer 3 encapsulated Layer 2 data that is to be transmitted through the Layer 2 interface. In some embodiments, the encapsulation and de-encapsulation may be performed substantially as described in FIG. 3, or similarly, although the scope of the invention is not so limited.

FIG. 7 is a block flow diagram of a first detailed embodiment of a method 770, which is performed in an active network element, of limiting disruption in the handling of sessions handled by the active network element. In some embodiments, the method 770 may be performed by the active network element of FIG. 4 and/or the active network element of FIG. 6. Alternatively, the method may be performed by a similar or an entirely different active network element. Moreover, the active network elements of FIGS. 4 and 6 may perform the method 770, similar methods, or entirely different methods.

The method includes monitoring a Layer 2 interface for failures, at block 771. A failure is detected on the Layer 2 interface, at block 772. The Layer 2 interface is shut down in response to detecting the failure, at block 773. At block 774, the active network element communicates with a standby network element over an inter-chassis communication channel, in response to detecting the failure on the Layer 2 interface, to implement a switchover in which the standby network element is to become the new active network element to handle sessions previously handled by the active network element.

FIG. 8 is a block diagram of a second detailed embodiment of an active network element 820 and a standby network element 822. The interfaces, modules, and other components of the second embodiment of FIG. 8, unless otherwise specified, or clearly apparent, may optionally have the same or similar characteristics as the correspondingly named components of the first embodiment of FIG. 6. To avoid obscuring the description, all of these similarities will not be repeated, but rather the description will emphasize the different and/or additional characteristics pertaining to the second embodiment of FIG. 8.

Each of the active and standby network elements includes a corresponding inter-chassis redundancy (ICR) system 830, 860. The ICR system 830 of the active network element includes a Layer 2 interface monitor module 832 that is operable to monitor the Layer 2 interface 826 for failures (e.g., failures of a Layer 2 port and/or a LAG). In some embodiments, the active network element may include a Layer 2 interface shutdown module 848, which may be as described elsewhere herein.

The ICR system 830 also includes a traffic redirection module 834 coupled with the Layer 2 interface monitor module. In some embodiments, the traffic redirection module 834 may be operable, in response to the detection of a failure on the Layer 2 interface 826, to cause an inter-chassis communication module 836 to transmit uplink data, which has been received on the Layer 3 interface 828, to the standby network element 822, over the inter-chassis communication channel 824. The channel may be sized or have a capacity sufficient for the redirected traffic. In some embodiments, the active network element may be configured with routes 863 to the standby network element that are to be used for the uplink data or uplink traffic redirection in the event of such a failure. In some embodiments, the active network element may optionally include a dynamic route install module 864 that is operable, in response to the detection of the failure, to dynamically install the routes. In some embodiments, the dynamic route install module may be operable to un-install the routes when the failure has been remedied. Alternatively, the routes may be statically or permanently installed, selected for use upon detection of the failure, and de-selected upon remedy of the failure. The standby network element 822, after receiving the redirected uplink data from the active network element, over the inter-chassis communication channel, may be operable to transmit the received data to the network element B 854 through its Layer 2 interface 858.

In some embodiments, a traffic redirection module 861 of the standby network element 822 may be operable in response to a failure on the Layer 2 interface 826 of the active network element 820, to transmit downlink data, which has been received on the Layer 2 interface 858 of the standby network element 822, to the active network element 820, over the inter-chassis communication channel 824. The standby network element 822 may have routes 865 to the active network element 820. In some embodiments, these routes may be installed during start-up. These routes may be operable to allow the standby network element to forward the downlink data received on its L2 interface to the active network element over the inter-chassis communication channel. Correspondingly, in some embodiments, the active network element may be operable to receive data from the standby network element, over the inter-chassis communication channel. In one aspect, the active network element may transmit the data it has received from the standby network element to the link A 856 through the Layer 3 interface 828.

Referring to the illustration, initially, as shown at numeral (1), Layer 2 data may be exchanged with network element A 852 on the Layer 2 interface 826 of the active network element 822. Also, Layer 3 data may be exchanged over link A 856 on the Layer 3 interface 828 of the active network element 820. Then, as shown at numeral (2), the Layer 2 interface monitor module 832 may detect a failure (designated by an "X") on the Layer 2 interface 826 of the active network element. As shown at numeral (3), subsequent uplink traffic may be received at the Layer 3 interface 828 of the active network element 820. Notice that the Layer 3 interface 828 is not shut down in this embodiment. As shown at numeral (4), the traffic redirection module 834 may use the routes 863 to forward the uplink traffic to the standby network element 822 over the inter-chassis communication channel 824. As shown at numeral (5), the standby network element 822 may transmit the uplink traffic through its Layer 2 interface 858 to the network element B 854. Sometime after the failure, which may occur concurrently or in parallel with one or more of numerals (3)-(5), the network (e.g., the MC LAG 853, 855) may detect the failure. As shown at numeral (6), subsequent downlink traffic may be sent from the network element B 854 to the Layer 2 interface 858 of the standby network element 822. As shown at numeral (7), the traffic redirection module 861 may use the routes 865 to forward the downlink traffic to the active network element 820 over the inter-chassis communication channel 824. As shown at numeral (8), the active network element 820 may transmit the downlink traffic through its Layer 3 interface 828 to the link A 856.

Although in the description above a failure on the Layer 2 interface 826 has been described, other embodiments pertain to failures on the Layer 3 interface 828. As shown, in some embodiments, the active network element may include a Layer 3 interface monitor module 849. In some embodiments, when a failure on the Layer 3 interface occurs, downlink traffic may be received from the network element A 852 on the Layer 2 interface 826 of the active network element 820, redirected by the traffic redirection module 834 to the standby network element 822 over the inter-chassis communication channel 824, and transmitted from the Layer 3 interface 859 of the standby network element 822 to the link B 857. Uplink traffic may be received over the link B 857 through the Layer 3 interface 859 of the standby network element 822, redirected by the traffic redirection module 861 to the active network element 820 over the inter-chassis communication channel 824, and transmitted from the Layer 2 interface 826 of the active network element 820 to the network element A 852.

Advantageously, this may help to limit disruption in the handling of the sessions (e.g., avoid service failures and/or outages) and/or may help to provide more seamless Layer 2 service. The Layer 2 interface 858 of the standby network element, instead of the failed Layer 2 interface 826 of the active network element, may be used to convey the data. A formal switchover of active/standby roles is not required.

FIG. 9 is a block flow diagram of a second detailed embodiment of a method 990, which is performed in an active network element, of limiting disruption in the handling of sessions handled by the active network element. In some embodiments, the method 990 may be performed by the active network element of FIG. 4 and/or the active network element of FIG. 8. Alternatively, the method may be performed by a similar or an entirely different active network element. Moreover, the active network elements of FIGS. 4 and 8 may perform the method 990, similar methods, or entirely different methods.

The method includes monitoring a Layer 2 interface for failures, at block 991. A failure is detected on the Layer 2 interface, at block 992. The Layer 2 interface is shut down in response to detecting the failure, at block 993. Routes from the active network element to the standby network element may optionally be dynamically installed, at block 994. At block 995, data received on a Layer 3 interface of the active network element is transmitted, from the active network element to the standby network element, over an inter-chassis communication channel. At block 996, data is optionally received from the standby network element, over the inter-chassis communication channel. In one aspect, the active network element may transmit the received data through its Layer 3 interface.

While embodiments of the invention have been described in relation to active and standby network elements, other embodiments may involve network elements that are each active for a different portion of the network traffic and backup or standby for the portion of the network traffic that is active on the other network element. For example, two network elements may each be active for part (e.g., 50%) of the network traffic or sessions anchored to that network element. Each network element may handle signaling and data traffic for the network traffic or sessions it anchors, and may provide redundancy (e.g., synchronized session data) for the sessions that are anchored to the other network element.

While embodiments of the invention have been described in relation to two network elements participating in a redundancy mechanism, other embodiments may include three or more network elements participating in a redundancy mechanism. Therefore, embodiments of the invention are not limited to purely active and standby network element redundancy schemes.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. Those skilled in the art will recognize that the invention can be practiced with modification and alteration within the spirit and scope of the appended claims. The description is thus to be regarded as illustrative instead of limiting. The scope of the invention is not to be determined by the specific examples provided above but only by the claims below.

In other instances, well-known circuits, structures, devices, and operations have been shown in block diagram form or without detail in order to avoid obscuring the understanding of the description. Further, where considered appropriate, reference numerals or terminal portions of reference numerals have been repeated among the figures to indicate corresponding or analogous elements, which may optionally have similar characteristics.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as tangible, non-transitory computer-readable storage media and non-tangible transitory computer-readable communication or transmission media. A few representative examples of tangible, non-transitory computer-readable storage media include, but are not limited to, magnetic disks; optical disks; random access memory (RAM), such as static-RAM (SRAM) and dynamic-RAM (DRAM), read only memory (ROM), such as programmable ROM (PROM), erasable-and-programmable ROM (EPROM), and electrically-erasable-and-programmable ROM (EEPROM), flash memory devices; phase-change memory, and the like. The tangible storage media may include one or more solid or tangible physical materials, such as, for example, a semiconductor material, a phase change material, a magnetic material, etc. Embodiments pertain to an article of manufacture that includes a tangible non-transitory computer-readable storage media storing a sequence of instructions that if executed by a machine (e.g., a network element, switch, router, end station, host, computer system, or electronic device having at least one microprocessor) causes or results in the machine performing one or more operations or methods disclosed herein. A few representative examples of non-tangible transitory computer-readable transmission media include, but are not limited to, electrical, optical, acoustical or other form of propagated signals—such as carrier waves, infrared signals, and digital signals. In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

What is claimed is:

1. A method in an active network element that is coupled with a standby network element by an inter-chassis communication channel used to synchronize session state for sessions handled by the active network element from the active network element to the standby network element, and that is deployed in a Layer 3 network that is used to transmit Layer 2 data, the method one of limiting disruption in the handling of the sessions, the method comprising steps of:
  monitoring a Layer 2 interface of the active network element for failures;
  monitoring a Layer 3 interface of the active network element for failures;
  detecting a failure on the Layer 2 interface; and
  communicating with the standby network element over the inter-chassis communication channel, in response to detecting the failure on the Layer 2 interface, to redirect traffic associated with the sessions received on the Layer 3 interface of the active network element to a Layer 2 interface of the standby network element, wherein the communicating includes:
  transmitting data, associated with the sessions and received on the Layer 3 interface of the active network element, over the inter-chassis communication channel to the standby network element to be transmitted out of the standby network element over the Layer 2 interface of the standby network element while avoiding the use of the Layer 2 interface of the active network element,
  receiving data from the Layer 2 interface of the standby network element over the inter-chassis communication channel, and transmitting the data received from the standby network element over the inter-chassis communication channel through the Layer 3 interface of the active network element.

2. The method of claim 1, further comprising a step of shutting down the Layer 2 interface of the active network element in response to detecting the failure.

3. The method of claim 1, further comprising, in response to detecting the failure, a step of dynamically installing a route, from the active to the standby network element, for the data that is to be transmitted from the active to the standby network element.

4. The method of claim 1, further comprising steps of:
   receiving the Layer 2 data, which comprises Ethernet data, on the Layer 2 interface;
   performing a Layer 3 encapsulation of the Layer 2 data; and
   transmitting the Layer 3 encapsulated Layer 2 data through the Layer 3 interface.

5. The method of claim 1, wherein the step of monitoring the Layer 2 interface comprises monitoring at least one Layer 2 port and at least one Link Aggregation Group.

6. The method of claim 1, wherein the step of monitoring the Layer 2 interface comprises monitoring the Layer 2 interface within a cellular network.

7. The method of claim 1, wherein the step of monitoring the Layer 2 interface comprises monitoring the Layer 2 interface of a packet data network gateway (PDN-GW).

8. An active network element, operable to be coupled with a standby network element by an inter-chassis communication channel, and operable to be deployed in a Layer 3 network that is to be used to transmit Layer 2 data, the active network element comprising:
   a Layer 2 interface;
   a Layer 3 interface; and
   an inter-chassis redundancy (ICR) system coupled with the Layer 2 and Layer 3 interfaces, the ICR system including:
   a Layer 2 interface monitor module to monitor the Layer 2 interface for failures;
   an inter-chassis communication module that is operable to synchronize session state, for sessions that are to be handled by the active network element, from the active network element to the standby network element; and
   at least one module coupled with the Layer 2 interface monitor module and the inter-chassis communication module, the at least one module, in response to a failure detected on the Layer 2 interface by the Layer 2 interface monitor module, operable to cause the inter-chassis communication module to communicate with the standby network element, over the inter-chassis communication channel, to redirect traffic, associated with the sessions received on the Layer 3 interface of the active network element, to a Layer 2 interface of the standby network, wherein to communicate includes to transmit data, associated with the sessions and received on the Layer 3 interface of the active network element, over the inter-chassis communication channel to the standby network element to be transmitted out of the standby network element over the Layer 2 interface of the standby network element while avoiding the use of the Layer 2 interface of the active network element, and wherein the at least one module is further operable to cause the inter-chassis communication module to receive data from a Layer 2 interface of the standby network element over the inter-chassis communication channel, and wherein the data received from the standby network element over the inter-chassis communication channel is to be transmitted through the Layer 3 interface of the active network element.

9. The active network element of claim 8, operable to be coupled within a Long Term Evolution (LTE) cellular network.

10. The active network element of claim 8, further comprising a packet data network gateway (PDN-GW).

11. The active network element of claim 8, further comprising a Layer 2 interface shutdown module that is operable to shut down the Layer 2 interface of the active network element in response to the detected failure.

12. The active network element of claim 8, further comprising a dynamic route installation module that is operable, in response to the detection of the failure, to dynamically install a route, from the active to the standby network element, for the data that is to be transmitted from the active to the standby network element.

13. The active network element of claim 8, wherein the Layer 2 interface comprises at least one Layer 2 port and at least one Link Aggregation Group.

14. The active network element of claim 8, further comprising an encapsulation module that is operable to perform a Layer 3 encapsulation of Layer 2 data that has been received on the Layer 2 interface.

* * * * *

UNITED STATES PATENT AND TRADEMARK OFFICE
CERTIFICATE OF CORRECTION

PATENT NO.       : 9,130,865 B2                                Page 1 of 1
APPLICATION NO.  : 13/712642
DATED            : September 8, 2015
INVENTOR(S)      : Kar et al.

It is certified that error appears in the above-identified patent and that said Letters Patent is hereby corrected as shown below:

In The Specification

In Column 9, Line 37, delete "network element 622." and insert -- network element 620. --, therefor.

In Column 9, Line 39, delete "interface 657" and insert -- interface 628 --, therefor.

In Column 9, Line 39, delete "network element 622." and insert -- network element 620. --, therefor.

In Column 11, Lines 41-42, delete "network element 822." and insert -- network element 820. --, therefor.

Signed and Sealed this
Fifth Day of April, 2016

Michelle K. Lee
*Director of the United States Patent and Trademark Office*